US012669613B2

(12) United States Patent
Xie et al.

(10) Patent No.: US 12,669,613 B2
(45) Date of Patent: Jun. 30, 2026

(54) RADAR SYSTEM, OPTICAL DETECTOR, VEHICLE, AND OPTICAL DETECTION METHOD

(71) Applicant: YINWANG INTELLIGENT TECHNOLOGIES CO., LTD., Shenzhen (CN)

(72) Inventors: Chengzhi Xie, Wuhan (CN); Lei Yan, Wuhan (CN); Ke Huang, Wuhan (CN); Wen Zhao, Wuhan (CN); Wei Xiong, Wuhan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 821 days.

(21) Appl. No.: 17/994,539

(22) Filed: Nov. 28, 2022

(65) Prior Publication Data

US 2023/0092146 A1    Mar. 23, 2023

Related U.S. Application Data

(63) Continuation of application No. PCT/CN2020/092846, filed on May 28, 2020.

(51) Int. Cl.
*G01S 17/42* (2006.01)
*G01S 7/481* (2006.01)
*G01S 17/931* (2020.01)

(52) U.S. Cl.
CPC .......... *G01S 17/931* (2020.01); *G01S 7/4814* (2013.01); *G01S 7/4818* (2013.01)

(58) Field of Classification Search
CPC .... G01S 17/931; G01S 7/4814; G01S 7/4818; G01S 7/4815; G01S 7/4811;
(Continued)

(56) References Cited

U.S. PATENT DOCUMENTS 9,188,674 B2 * 11/2015 Suzuki ................. G01S 7/4817
9,810,786 B1 * 11/2017 Welford ................. G01S 7/484
(Continued)

FOREIGN PATENT DOCUMENTS

CN        101136222 A        3/2008
CN        109164464 A        1/2019
(Continued)

OTHER PUBLICATIONS

Extended European Search Report in European Appln No. 20938069.0, dated May 3, 2023, 17 pages.
(Continued)

*Primary Examiner* — Abdullahi Nur
(74) *Attorney, Agent, or Firm* — Fish & Richardson P.C.

(57) ABSTRACT

Example radar systems, optical detectors, vehicles, and optical detection methods are provided. An example radar system includes a laser device and an optical detector. The optical detector can include a first polarization scanner and a photosensitive device. The laser device can be configured to emit detection laser. The first polarization scanner can be configured to refract an echo signal of the detection laser, where a refractive index of the first polarization scanner is variable. The photosensitive device can be configured to sense the echo signal refracted by the first polarization scanner.

20 Claims, 18 Drawing Sheets

(58) Field of Classification Search

CPC ........ G01S 7/4817; G01S 7/499; G01S 17/42; G01S 17/89; G02B 1/002; G02B 5/3033; G02B 26/06; G02B 27/286

See application file for complete search history.

(56) References Cited

U.S. PATENT DOCUMENTS

| | | | | |
|---|---|---|---|---|
| 9,823,351 | B2 * | 11/2017 | Haslim | .................... G01S 17/06 |
| 10,107,914 | B2 * | 10/2018 | Kalscheur | ............. G01S 7/4814 |
| 2002/0122185 | A1 * | 9/2002 | Ono | ........................ G01B 11/25 |
| | | | | 356/601 |
| 2002/0186919 | A1 * | 12/2002 | Pepper | .................... G02F 1/011 |
| | | | | 385/27 |
| 2005/0020926 | A1 * | 1/2005 | Wiklof | .............. G02B 27/0994 |
| | | | | 348/E9.011 |
| 2005/0099622 | A1 * | 5/2005 | Caracci | ................ G01N 21/253 |
| | | | | 356/300 |
| 2011/0109909 | A1 * | 5/2011 | Wu | ........................... G01J 3/26 |
| | | | | 362/19 |
| 2013/0032722 | A1 * | 2/2013 | Szupryczynski | ..... G01T 1/2978 |
| | | | | 250/361 R |
| 2016/0195479 | A1 * | 7/2016 | Pfaff | ...................... G01N 21/23 |
| | | | | 356/458 |
| 2018/0217258 | A1 * | 8/2018 | Hirasawa | ................ G01S 17/86 |
| 2018/0248267 | A1 | 8/2018 | Akselrod | |
| 2019/0018120 | A1 * | 1/2019 | Efimov | ................. H10F 77/413 |

FOREIGN PATENT DOCUMENTS

| | | | |
|---|---|---|---|
| CN | 208999565 | U | 6/2019 |
| CN | 209373107 | U * | 9/2019 |
| DE | 102018204269 | A1 | 9/2019 |
| EP | 1105771 | B1 | 3/2004 |
| WO | 2019205164 | A1 | 10/2019 |

OTHER PUBLICATIONS

International Search Report and Written Opinion in International Appln. No. PCT/CN2020/092846, mailed on Mar. 2, 2021, 16 pages (with English translation).

* cited by examiner

| Field of view 1 | Field of view 2 | Field of view 3 | Field of view 4 | Field of view 5 |

Laser module

Field of view 3

Photosensitive device

First polarization scanner

Laser module

| 11 | 12 | 13 | 14 | 15 |
|----|----|----|----|----|
| 21 | 22 | 23 | 24 | 25 |
| 31 | 32 | 33 | 34 | 35 |

310

RADAR SYSTEM, OPTICAL DETECTOR, VEHICLE, AND OPTICAL DETECTION METHOD

CROSS-REFERENCE TO RELATED APPLICATIONS

This application is a continuation of International Application No. PCT/CN2020/092846, filed on May 28, 2020, the disclosure of which is hereby incorporated by reference in its entirety.

TECHNICAL FIELD

This application relates to the field of optical detection, and in particular, to a radar system, an optical detector, a vehicle, and an optical detection method.

BACKGROUND

With development of autonomous driving technologies, people have increasingly high requirements for an in-vehicle sensing system, and a radar system is a common in-vehicle sensing system.

In the radar system, nearby objects on a road surface are detected by using a photosensitive device. Specifically, as shown in FIG. 1, a laser of the radar system emits detection laser, and then detects an echo signal of the detection laser by using the photosensitive device. The photosensitive device includes a photosensitive chip and an optical lens. The optical lens focuses light on a focal plane. The photosensitive chip is disposed on the focal plane, senses light focused by the optical lens, and forms an image. To obtain a larger field of view (field of view, FOV), a size of a photosensitive surface of the photosensitive chip in the photosensitive device usually needs to be increased. As shown in FIG. 2, to increase an available field of view from FOV 1 to FOV 2 (FOV 2>FOV 1), a photosensitive surface of the photosensitive device needs to be changed from a small size to a large size.

However, a photosensitive surface with a larger size increases an area of a photosensitive chip, and the photosensitive chip is expensive. Consequently, costs of the photosensitive chip greatly increase due to increasing of the area of the photosensitive chip.

SUMMARY

Embodiments of this application provide a radar system, an optical detector, a vehicle, and an optical detection method, to perform optical detection from a plurality of angles.

According to a first aspect, this application provides a radar system, including a laser module and an optical detector. The optical detector includes a first polarization scanner and a photosensitive device. The laser module is configured to emit detection laser. The first polarization scanner is configured to refract an echo signal of the detection laser. A refractive index of the first polarization scanner is variable. The photosensitive device is configured to sense the echo signal refracted by the first polarization scanner.

When the laser module emits the detection laser, because the refractive index of the first polarization scanner is variable, the first polarization scanner refracts the echo signal of the detection laser by using different refractive indices, so that the photosensitive device can sense echo signals at different angles. This increases a field of view of the radar system, and reduces costs of the photosensitive device compared with a solution of increasing a photosensitive area of a photosensitive chip in the photosensitive device.

In some possible implementations, the first polarization scanner includes a drive circuit and a polarizer. Because a refractive index of the polarizer is variable, and the drive circuit is configured to apply a target drive voltage to the polarizer, when the target drive voltage is applied to the polarizer, a first refractive index may be generated, to refract the echo signal of the detection laser by using the first refractive index.

In some possible implementations, a material of the polarizer is a metamaterial with a variable refractive index, or a surface of the polarizer is covered with the metamaterial with the variable refractive index, so that the refractive index of the polarizer is variable. It should be noted that the metamaterial is a type of artificial materials with special properties. These materials have some special properties, for example, a property (for example, a refractive index) of the material is changed by light and electromagnetic waves. In this embodiment of this application, a used metamaterial is a material whose refractive index can be changed by applying a drive voltage, for example, a liquid crystal. It should be noted that, when the metamaterial covers a surface of an object, the metamaterial may also be referred to as a metasurface. In this embodiment of this application, because the material of the polarizer 3212 is the metamaterial with the variable refractive index, or the surface of the polarizer 3212 is covered with the metamaterial with the variable refractive index, the target voltage may be applied to the polarizer 3212, to change the refractive index of the polarizer 3212.

In some possible implementations, the optical detector further includes a control chip. The control chip is configured to: determine the first refractive index based on a target sub-field of view, and determine the target drive voltage based on the first refractive index, so that the target drive voltage can be applied to the polarizer, to control the refractive index of the polarizer.

In some possible implementations, the first polarization scanner is configured to refract the echo signal of the detection laser to the photosensitive device. In some possible implementations, the first polarization scanner further includes a reflector. The reflector is configured to reflect, to the photosensitive device, the echo signal refracted by the polarizer, so that the echo signal is applicable to an apparatus with a complex structure.

In some possible implementations, the laser module includes N laser lights. The N laser lights are in a one-to-one correspondence with N sub-fields of view. Any one of the N laser lights is configured to emit the detection laser to a corresponding sub-field of view in the N sub-fields of view. The N sub-fields of view include the target sub-field of view, so that the first polarization scanner 321 can sense the echo signal that is of the detection laser and that is in the N sub-fields of view.

In some possible implementations, any one of the N laser lights includes an edge emitting laser (edge emitting laser, EEL) module and a quartz fiber. The EEL is configured to emit the detection laser to the quartz fiber, and the quartz fiber is configured to optically shape the detection laser, so that the detection laser is irradiated on a corresponding sub-field of view, to implement irradiation on the N sub-fields of view.

In some possible implementations, the laser module includes a laser module and a second polarization scanner. The laser module is configured to emit the detection laser to the second polarization scanner. The second polarization scanner is configured to refract the detection laser by using a second refractive index, so that the detection laser is irradiated on the target sub-field of view. Energy of the laser module is concentrated on one sub-field of view, so that the laser module can irradiate farther. In this case, the first polarization scanner can sense a farther echo signal, to obtain double gains of increasing the field of view and sensing in a longer distance.

In some possible implementations, the photosensitive device includes an optical lens and a photosensitive chip. The optical lens is configured to focus, on the photosensitive chip, the echo signal refracted by the first polarization scanner. The photosensitive chip is configured to sense the echo signal focused by the optical lens.

In some possible implementations, the N sub-fields of view are horizontally arranged, and any two of the N sub-fields of view do not overlap. The field of view is divided into the N sub-fields of view, so that echo signals of the sub-fields of view can be sensed one by one. This can increase the field of view when the photosensitive area of the photosensitive chip is not increased.

In some possible implementations, the N sub-fields of view are horizontally arranged in n1 rows and vertically arranged in n2 columns. N is equal to n1 multiplied by n2, and both n1 and n2 are positive integers greater than or equal to 2. Any two of the N sub-fields of view do not overlap, to flexibly sense the sub-field of view on a two-dimensional plane.

According to a second aspect, this application provides an optical detector, including a first polarization scanner and a photosensitive device. The first polarization scanner is configured to refract an optical signal. A refractive index of the first polarization scanner is variable. The photosensitive device is configured to sense the optical signal refracted by the first polarization scanner.

In some possible implementations, the first polarization scanner includes a drive circuit and a polarizer. Because a refractive index of the polarizer is variable, and the drive circuit is configured to apply a target drive voltage to the polarizer, when the target drive voltage is applied to the polarizer, a first refractive index may be generated, to refract the refracted optical signal by using the first refractive index.

In some possible implementations, a material of the polarizer is a metamaterial with a variable refractive index, or a surface of the polarizer is covered with the metamaterial with the variable refractive index, so that the refractive index of the polarizer is variable.

In some possible implementations, the optical detector further includes a control chip. The control chip is configured to: determine the first refractive index based on a target sub-field of view, and determine the target drive voltage based on the first refractive index, so that the target drive voltage can be applied to the polarizer, to control the refractive index of the polarizer.

In some possible implementations, the first polarization scanner is configured to refract the refracted optical signal to the photosensitive device, so that the first polarization scanner has a simple structure.

In some possible implementations, the first polarization scanner further includes a reflector. The reflector is configured to reflect, to the photosensitive device, the optical signal refracted by the polarizer, so that the optical signal is applicable to an apparatus with a complex structure.

In some possible implementations, the photosensitive device includes an optical lens and a photosensitive chip. The optical lens is configured to focus, on the photosensitive chip, the optical signal refracted by the first polarization scanner. The photosensitive chip is configured to sense the optical signal focused by the optical lens.

In some possible implementations, the N sub-fields of view are horizontally arranged, and any two of the N sub-fields of view do not overlap. The field of view is divided into the N sub-fields of view, so that optical signals of the sub-fields of view can be sensed one by one. This can increase the field of view when the photosensitive area of the photosensitive chip is not increased.

In some possible implementations, the N sub-fields of view are horizontally arranged in n1 rows and vertically arranged in n2 columns. N is equal to n1 multiplied by n2, and both n1 and n2 are positive integers greater than or equal to 2. Any two of the N sub-fields of view do not overlap, to flexibly sense the sub-field of view on a two-dimensional plane.

According to a third aspect, this application provides a vehicle, including a vehicle control system and the radar system in the implementations of the first aspect. The vehicle control system is configured to determine a target sub-field of view. The radar system is configured to emit the detection laser and sense an echo signal that is of the detection laser and that is in the target sub-field of view.

In some possible implementations, the vehicle control system is further configured to detect an object and a distance from the object based on the echo signal refracted by the first polarization scanner, to assist a user in driving.

In some possible implementations, the laser module and the optical detector in the radar system are separately mounted at different locations of the vehicle. For example, the laser module is mounted on a headlight or a fog lamp of the vehicle, and the optical detector is mounted on a bumper or a windshield of the vehicle. Such a mounting manner is flexible, and provides sufficient space for modeling design of a private passenger vehicle.

According to a fourth aspect, this application provides an optical detection method, applied to a radar system. The radar system includes a laser module and a first polarization scanner. The method includes: driving the laser module to emit detection laser; determining a first refractive index of the first polarization scanner based on a target sub-field of view; and controlling the first polarization scanner to generate the first refractive index.

In some possible implementations, the controlling the first polarization scanner to generate the first refractive index includes: determining a target drive voltage based on the first refractive index, and applying the target drive voltage to the first polarization scanner.

In some possible implementations, the driving the laser module to emit detection laser is driving the laser module to send the detection laser to the target sub-field of view.

It can be learned from the foregoing technical solutions that embodiments of this application have the following advantages.

When the laser module emits the detection laser, because the refractive index of the first polarization scanner is variable, the first polarization scanner refracts the echo signal of the detection laser by using different refractive indices, so that the photosensitive device senses echo signals at different angles. This increases a field of view of the radar system, and reduces costs of the photosensitive device compared with a solution of increasing a photosensitive area of a photosensitive chip in the photosensitive device.

DESCRIPTION OF EMBODIMENTS

Embodiments of this application provide a radar system, an optical detector, a vehicle, and an optical detection method, to perform optical detection from a plurality of angles.

The technical solutions of this application may be applied to scenarios such as a camera and an in-vehicle sensing system. The radar system is a common in-vehicle sensing system. In a current radar system, nearby objects on a road surface are detected by using a photosensitive device. Currently, to obtain a larger field of view, a size of a photosensitive surface of a photosensitive chip usually needs to be increased. However, a photosensitive surface with a larger size requires a photosensitive chip with a larger area, which greatly increases costs of the photosensitive surface.

Figure 1:
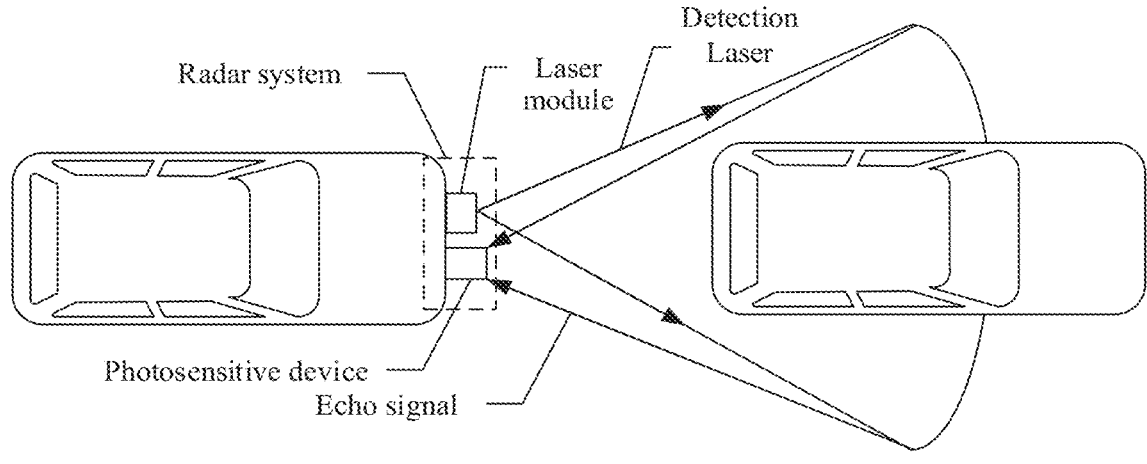
FIG. 1 is a schematic diagram in which a laser module of a radar system emits detection laser.
Figure 2:
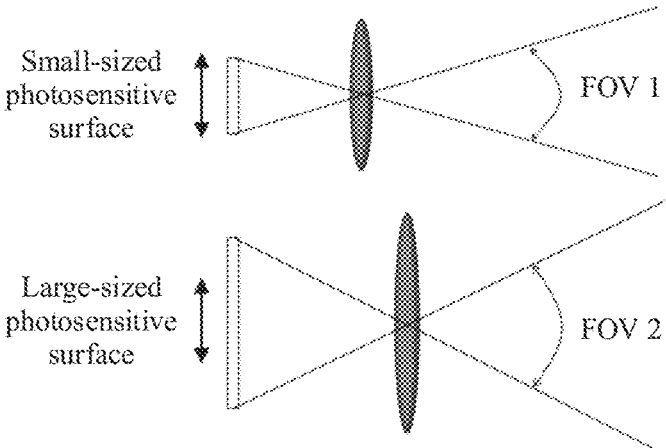
FIG. 2 is a schematic diagram of a relationship between a photosensitive surface of a photosensitive device and a field of view.
Figure 3:
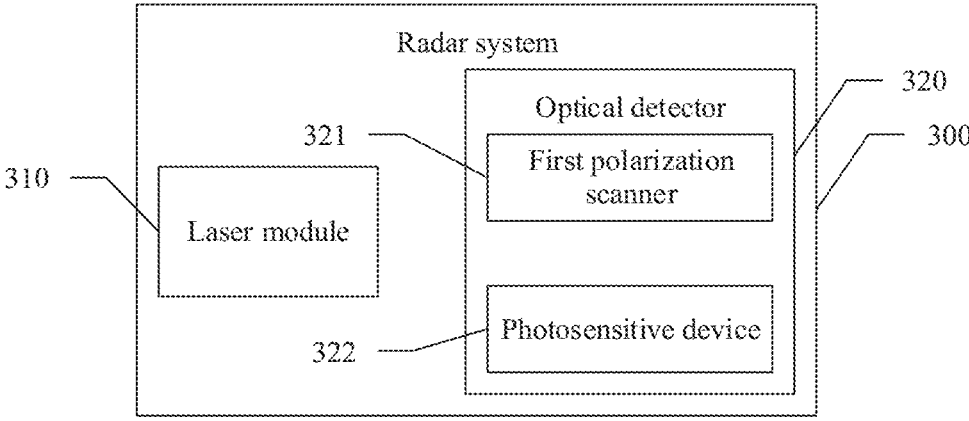
FIG. 3 is a schematic diagram of an embodiment of a radar system according to this application.

Therefore, refer to FIG. 3. This application provides a radar system 300, including a laser module 310 and an optical detector 320. The optical detector 320 includes a first polarization scanner 321 and a photosensitive device 322, and a refractive index of the first polarization scanner 321 is variable.

When the laser module 310 emits detection laser, because a refractive index of the first polarization scanner 321 is variable, the first polarization scanner 321 can refract an echo signal of the detection laser by using different refractive indices, so that the photosensitive device 322 can sense echo signals at different angles. This increases a field of view of the radar system 300, and reduces costs of the photosensitive device 322 compared with a solution of increasing a photosensitive area of a photosensitive chip 322 in the photosensitive device 322.

Figure 4:
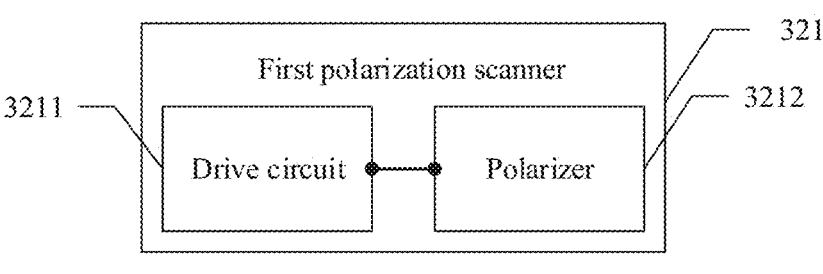
FIG. 4 is a schematic diagram of an embodiment of a first polarizing scanner.

Refer to FIG. 4. In some possible implementations, the first polarization scanner 321 includes a drive circuit 3211 and a polarizer 3212. A refractive index of the polarizer 3212 is variable. The drive circuit 3211 is configured to: apply a target drive voltage to the polarizer 3212, generate a first refractive index when the target drive voltage is applied to the polarizer 3212, and refract the echo signal of the detection laser by using the first refractive index.

In some possible implementations, a material of the polarizer 3212 is a metamaterial with a variable refractive index, or a surface of the polarizer 3212 is covered with the metamaterial with the variable refractive index.

It should be noted that the metamaterial is a type of artificial materials with special properties. These materials have some special properties, for example, a property (for example, a refractive index) of the material is changed by light and electromagnetic waves. In this embodiment of this application, a used metamaterial is a material whose refractive index can be changed by applying a drive voltage, for example, a liquid crystal. It should be noted that, when the metamaterial covers a surface of an object, the metamaterial may also be referred to as a metasurface.

Figure 5:
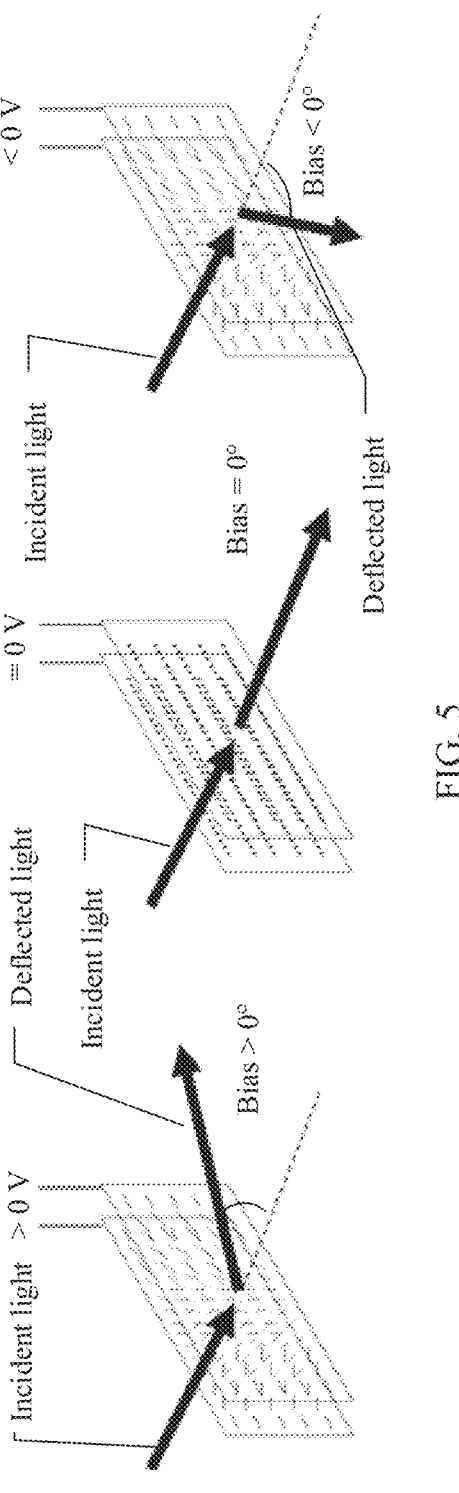
FIG. 5 is a schematic diagram of a principle of changing a refractive index of a metamaterial.

The following uses an example for description. As shown in FIG. 5, when a positive drive voltage is applied to the metamaterial (that is, a drive voltage greater than 0 V is applied), the polarizer generates a positive refractive index for incident light, that is, the refractive index (bias) >0°, to form deflected light. When no drive voltage is applied to the metamaterial (that is, a drive voltage equal to 0 V is applied), that is, bias=0° (a refractive index of the material is ignored in this example), and the polarizer transmits incident light. When a negative drive voltage is applied to the metamaterial (that is, a drive voltage less than 0 V is applied), the polarizer generates a negative refractive index for the light, that is, bias <0°, to form deflected light. It should be noted that a positive direction and a negative direction of a refractive index are relative probabilities. In this example, a direction same as a light direction is 0°, a clockwise refraction direction is a positive direction, and an anticlockwise refraction direction is a negative direction.

Because the refractive index of the polarizer 3212 is variable, in the first polarization scanner 321, different drive voltages may be applied to the polarizer 3212 by the drive circuit 3211, so that the polarizer 3212 generates different refractive indices. In this case, the refractive index of the first polarization scanner 321 is variable, so that the first polarization scanner 321 can refract the echo signal that is of the detection laser and that is in different sub-fields of view, and the photosensitive device 322 can sense the echo signal that is of the detection laser and that is at different angles.

The following uses an example for description.

Table 1 shows a drive voltage-refractive index-sub-field of view correspondence in this example. In Table 1, the drive circuit 3211 in the first polarization scanner 321 may apply five different drive voltages to the polarizer 3212: 10 V, 5 V, 0 V, –5 V, and –10 V, so that the polarizer 3212 may separately generate five different refractive indices: 60°, 30°, 0°, –30°, and

TABLE 1

| Sub-field of view | Drive voltage | Refractive index |
|---|---|---|
| Sub-field of view 1 | 10 V | 60° |
| Sub-field of view 2 | 5 V | 30° |
| Sub-field of view 3 | 0 V | 0° |
| Sub-field of view 4 | –5 V | –30° |
| Sub-field of view 5 | –10 V | –60° |

Figure 6:
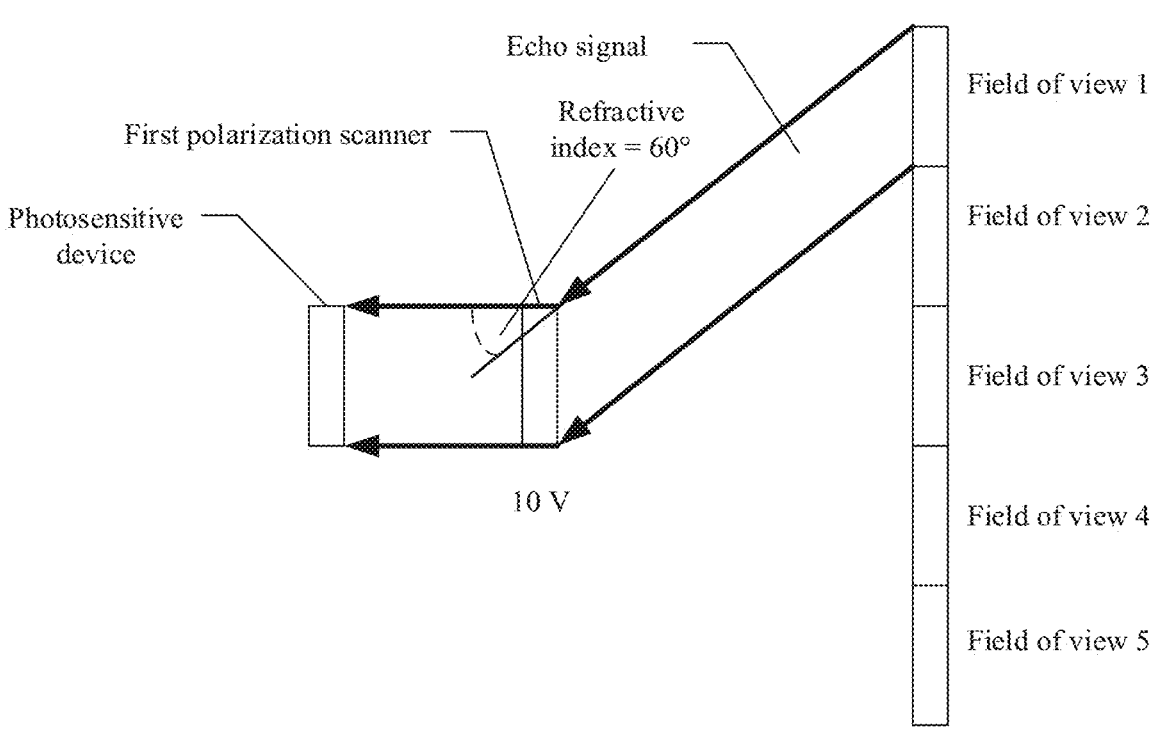
FIG. 6 is a schematic diagram of an embodiment in which a drive voltage is applied to a first polarization scanner to change a refractive index of the first polarization scanner.
Figure 7:
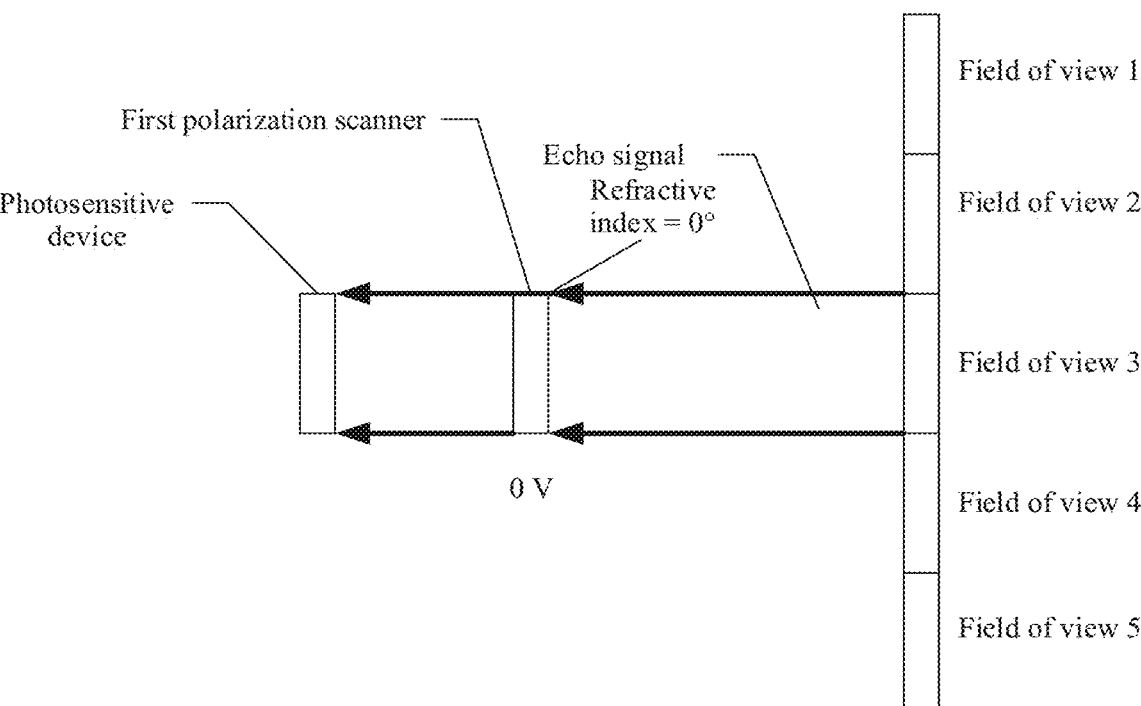
FIG. 7 is a schematic diagram of an embodiment in which a drive voltage is applied to a first polarization scanner to change a refractive index of the first polarization scanner.
Figure 8:
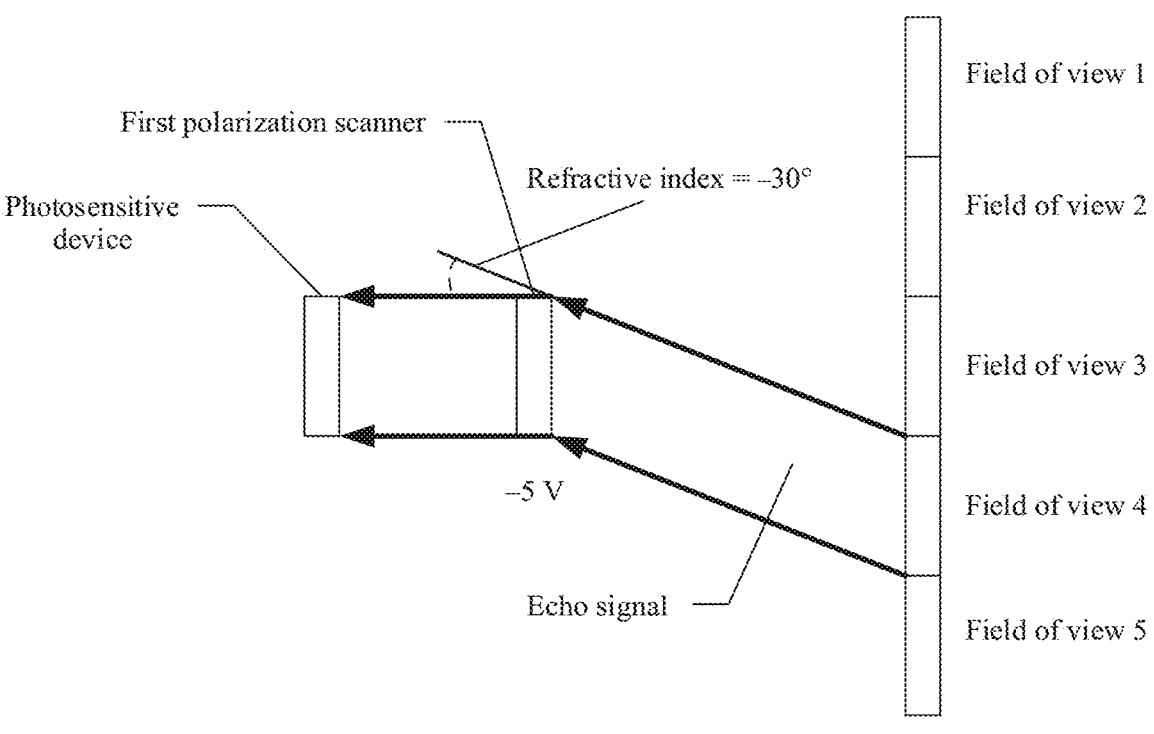
FIG. 8 is a schematic diagram of an embodiment in which a drive voltage is applied to a first polarization scanner to change a refractive index of the first polarization scanner.

For example, as shown in FIG. 6, a voltage applied to the polarizer 3212 by the drive circuit 3211 is 10 V. and a generated refractive index of the polarizer 3212 is 60°, so that the polarizer 3212 can refract an echo signal of the field of view 1 to the photosensitive device 322, and the photosensitive device 322 can sense the echo signal of the sub-field of view 1. As shown in FIG. 7, a voltage applied to the polarizer 3212 by the drive circuit 3211 is 0 V. and a generated refractive index of the polarizer 3212 is 0°, so that the polarizer 3212 can refract an echo signal of the field of view 3 to the photosensitive device 322, and the photosensitive device 322 can sense the echo signal of the sub-field of view 3. As shown in FIG. 8, a voltage applied to the polarizer 3212 by the drive circuit 3211 is –5 V, and a generated refractive index of the polarizer 3212 is –30°, so that the polarizer 3212 can refract an echo signal of the field of view 4 to the photosensitive device 322, and the photosensitive device 322 can sense the echo signal of the sub-field of view 4.

Therefore, five different drive voltages are applied to the drive circuit 3211, so that the polarizer 3212 can separately generate five different refractive indices. In this case, the photosensitive device 322 in the first polarization scanner 321 can sense five different sub-fields of view.

In some possible implementations, the refractive index of the first polarization scanner 321 may also be changed in two dimensions, for example, may be changed in both a horizontal direction and a vertical direction.

Figure 9:
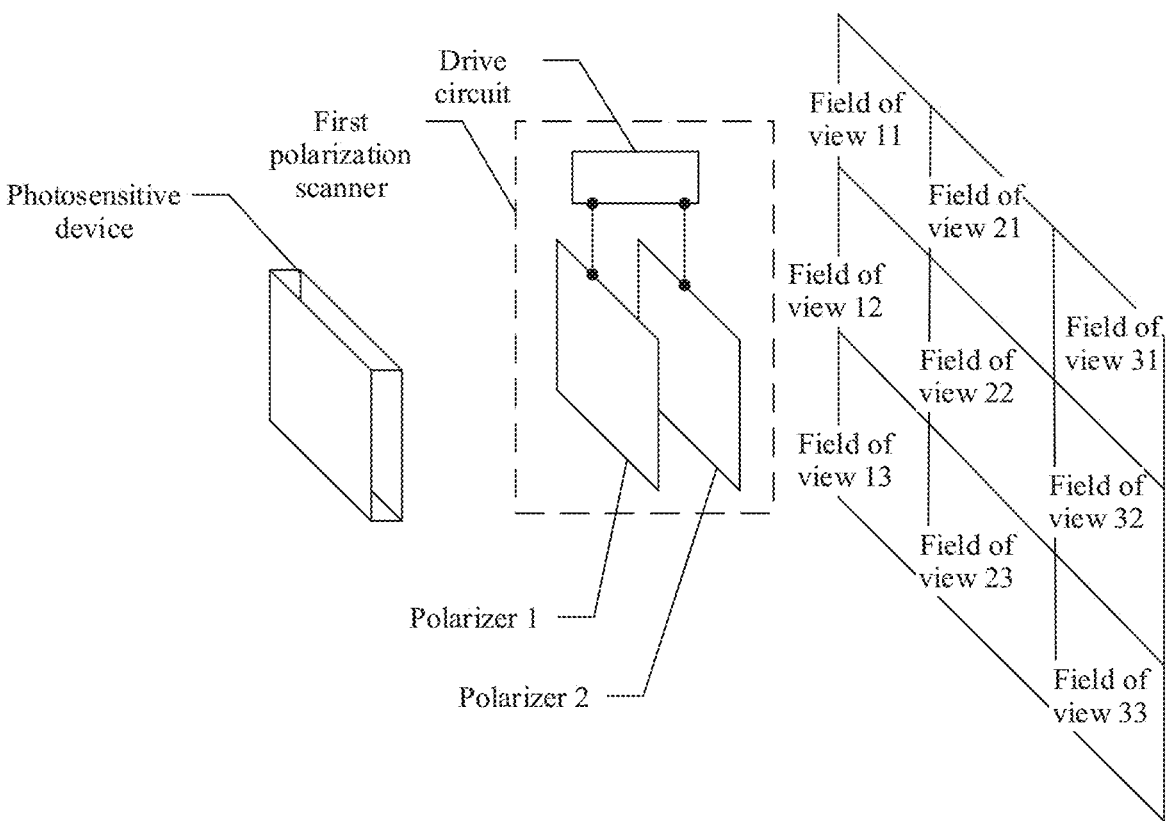
FIG. 9 is a schematic diagram of an embodiment in which a refractive index of a first polarization scanner is changed in two dimensions.

In some possible implementations, as shown in FIG. 9, at least two polarizers are disposed in the first polarization scanner 321, and a refractive index of each polarizer is changed in different directions. For example, two polarizers are respectively referred to as a polarizer 1 and a polarizer 2. A refractive index of the polarizer 1 is changed in the horizontal direction, and a refractive index of the polarizer 2 is changed in the vertical direction. In this case, when different drive voltages are applied to the polarizer 1, the refractive index of the polarizer 1 may be changed in the horizontal direction. When different drive voltages are applied to the polarizer 2, the refractive index of the polarizer 2 may be changed in the vertical direction. It can be learned that, when different drive voltages are separately applied to the polarizer 1 and the polarizer 2 by the drive circuit, the refractive index of the polarizer 1 is changed in the horizontal direction, and the refractive index of the polarizer 2 is changed in the vertical direction, to change the refractive index of the first polarization scanner 321 on a two-dimensional plane.

As shown in FIG. 9, it is assumed that the applied drive voltage is represented by (v1, v2), where v1 is the drive voltage applied to the polarizer 1, and v2 is the drive voltage applied to the polarizer 2. The refractive index is represented by (b1, b2), where b1 is the refractive index of the polarizer 1, and b2 is the refractive index of the polarizer 2. In this example, values of v1 are –5 V. 0 V, and 5 V, and values corresponding to b1 are –30°, 0°, and 30° respectively. Values of v2 are –5 V, 0 V. and 5 V, and values corresponding to b2 are –30°, 0°, and 30° respectively. Table 2 shows a drive voltage-refractive index-sub-field of view correspondence in this example.

TABLE 2

| Sub-field of view | Drive voltage (v1, v2) | Refractive index |
|---|---|---|
| Sub-field of view 11 | (5 V, 5 V) | (30°, 30°) |
| Sub-field of view 12 | (5 V, 0 V) | (30°, 0°) |
| Sub-field of view 13 | (5 V, –5 V) | (30°, –30°) |
| Sub-field of view 21 | (0 V, 5 V) | (0°, 30°) |
| Sub-field of view 22 | (0 V, 0 V) | (0°, 0°) |
| Sub-field of view 23 | (0 V, –5 V) | (0°, –30°) |
| Sub-field of view 31 | (–5 V, 5 V) | (–30°, 30°) |
| Sub-field of view 32 | (–5 V, 0 V) | (–30°, 0°) |
| Sub-field of view 33 | (–5 V, –5 V) | (–30°, –30°) |

For example, when the applied drive voltage is (5 V, 5 V), a generated refractive index of the first polarization scanner 321 is (30°, 30°), so that the polarizer 3212 may refract an echo signal of the field of view 11 to the photosensitive device 322, and the photosensitive device 322 may sense the echo signal of the sub-field of view 11. When the applied drive voltage is (0 V, 5 V), a generated refractive index of the first polarization scanner 321 is (0°, 30°), so that the polarizer 3212 can refract an echo signal of the field of view 12 to the photosensitive device 322, and the photosensitive device 322 may sense the echo signal of the sub-field of view 21. When the applied drive voltage is (–5 V, 0 V), a generated refractive index of the first polarization scanner 321 is (–30°, 0°), so that the polarizer 3212 can refract an echo signal of the field of view 23 to the photosensitive device 322, and the photosensitive device 322 can sense the echo signal of the sub-field of view 32. In this case, nine different drive voltages are applied, so that the first polarization scanner 321 generates nine different refractive indices, and the photosensitive device 322 can sense nine different sub-fields of view.

Figure 10:
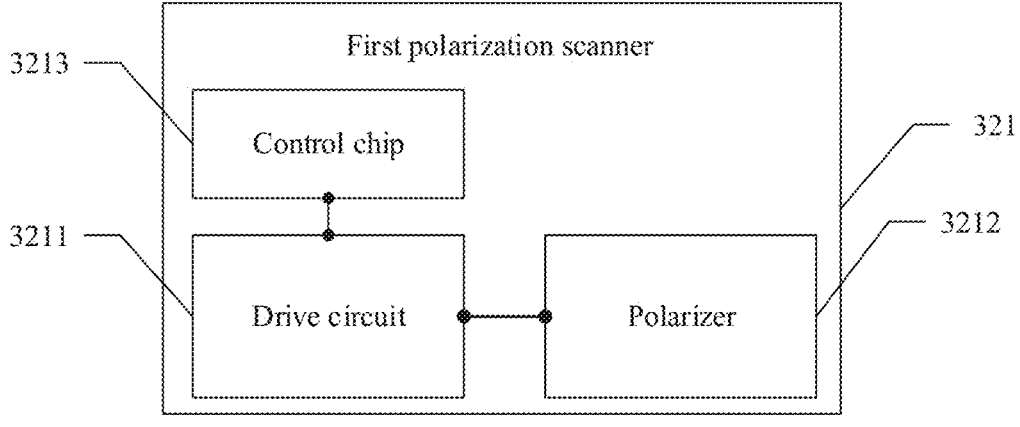
FIG. 10 is a schematic diagram of another embodiment of a first polarizing scanning.

To sense echo signals of different sub-fields of view, different refractive indices need to be determined based on different sub-fields of view, to determine different drive voltages. Therefore, in some possible implementations, as shown in FIG. 10, the optical detector 320 may further include a control chip 3213. The control chip 3213 is connected to the drive circuit 3211, and is configured to: determine the first refractive index based on the target sub-field of view, and determine the target drive voltage based on the first refractive index, so that the first polarization scanner 321 generates the first refractive index.

For example, if the target sub-field of view is the sub-field of view 32 shown in FIG. 9, it may be determined, based on Table 2, that a corresponding first refractive index is (−30°, 0°), and that a corresponding target drive voltage is (−5 V, 0 V). In this case, the control chip 3213 may control the drive circuit 3211 to apply a drive voltage of (−5 V, 0 V) to the first polarization scanner 321, to generate a refractive index of (−30°, 0°), so that the photosensitive device 322 senses an echo signal that is of the detection laser and that is in the sub-field of view 32.

It should be noted that the control chip 3213 may be a microcontroller unit (microcontroller unit, MCU), also referred to as a single chip microcomputer (single chip microcomputer), or a single-chip microcomputer, which is a chip-level computer formed by appropriately reducing a frequency and a specification of a central process unit (central process unit, CPU), and integrating, to a single chip, peripheral interfaces such as a memory (memory), a timer (timer), a universal serial bus (universal serial bus, USB), and analog-to-digital convertor (A/D), to perform control of different combinations on different application scenarios.

Figure 11:
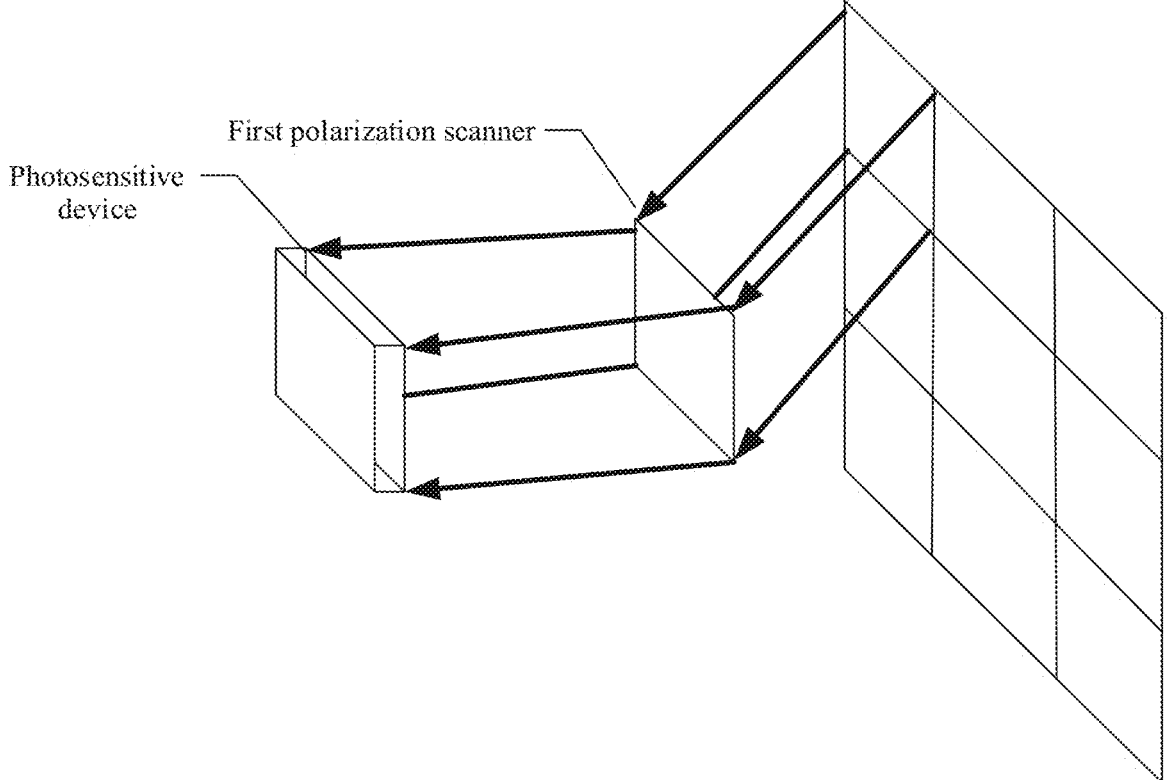
FIG. 11 is a schematic diagram of an embodiment of a transmissive first polarization scanner.
Figure 12:
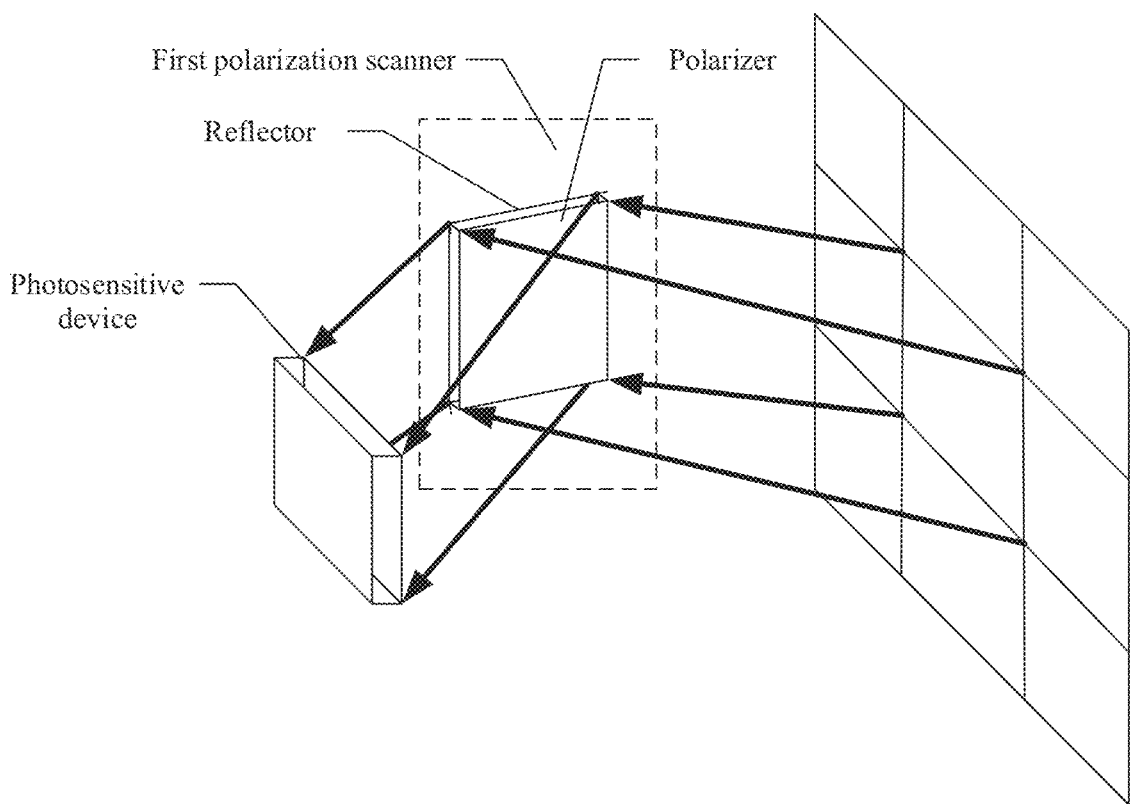
FIG. 12 is a schematic diagram of an embodiment of a reflective first polarization scanner.

In some possible implementations, the first polarization scanner 321 may be transmissive, or may be reflective. Specifically, as shown in FIG. 11, the polarizer 3212 of the transmissive first polarization scanner 321 directly refracts the echo signal of the detection laser to the photosensitive device 322. As shown in FIG. 12, a reflector is disposed in the reflective first polarization scanner 321. After being refracted by the first polarization scanner 321, the echo signal is irradiated on the reflector, and the reflector reflects light to the photosensitive device 322.

Figure 13:
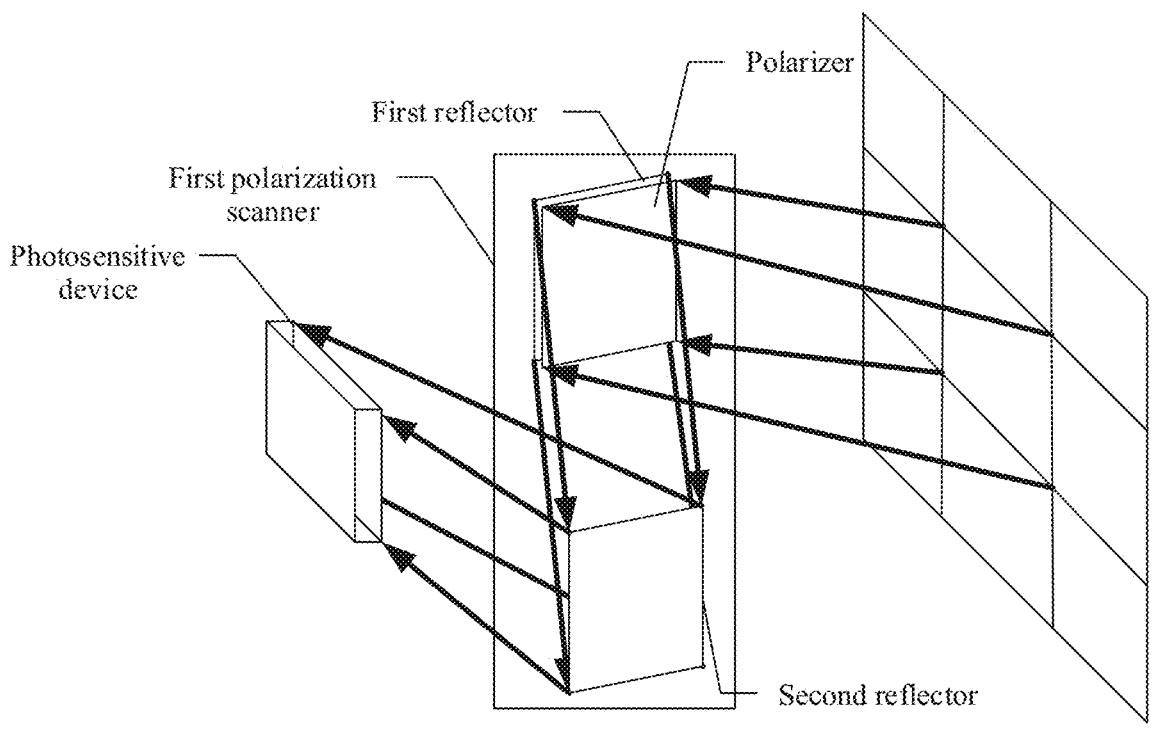
FIG. 13 is a schematic diagram of an embodiment in which a reflective first polarization scanner has a plurality of reflectors.

In some possible implementations, a plurality of reflectors may also be disposed in the first polarization scanner 321. After being reflected for a plurality of times, the light is finally irradiated on the photosensitive device 322. This is not limited herein. For example, as shown in FIG. 13, two reflectors are disposed in the first polarization scanner 321, which are respectively a first reflector and a second reflector. After being refracted, the light is irradiated on the first reflector. The first reflector reflects the light to the second reflector, and the second reflector reflects the light to the photosensitive device 322. In some possible implementations, more than two reflectors may be also disposed in the first polarization scanner 321. After being reflected for more than two times, the light is reflected to the photosensitive device 322. This is not limited herein.

Figure 14:
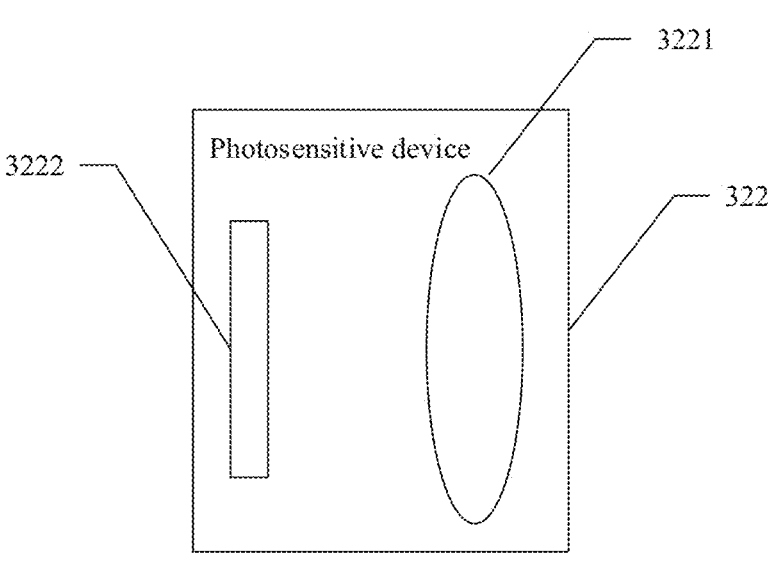
FIG. 14 is a schematic diagram of an embodiment of a photosensitive device.

In some possible implementations, as shown in FIG. 14, the photosensitive device 322 includes an optical lens 3221 and a photosensitive chip 3222. The optical lens 3221 is configured to focus, on the photosensitive chip 3222, the echo signal refracted by the first polarization scanner 321. The photosensitive chip 3222 is configured to sense the echo signal focused by the optical lens 3221.

It should be noted that the optical lens 3221 may be an entirety formed by combining one or more lenses by using a system. The lens may be a plastic lens or a glass lens, may be a spherical lens or an aspherical lens, or may be a refraction lens or a reflection lens. This is not limited herein. The optical lens 3221 focuses light of a scene on the photosensitive chip to form a clear image, to record an image of the scene. The photosensitive chip 3222 is a semiconductor chip. There are hundreds of thousands to millions of photodiodes on a surface of the photosensitive chip 3222, and a charge is generated when the photodiodes are irradiated by light, and is converted into a digital signal by using an analog-to-digital converter chip.

In some specific implementation scenarios, the field of view may be divided into N sub-fields of view, and any two sub-fields of view do not overlap.

Figure 15:
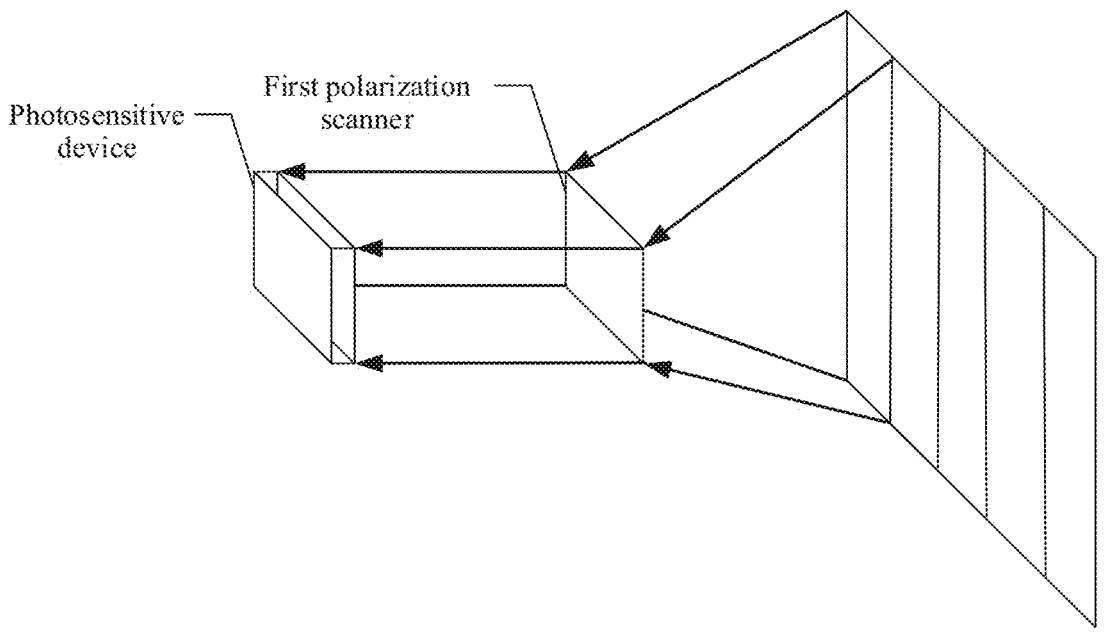
FIG. 15 is a schematic diagram of an embodiment of five non-overlapping sub-fields of view.
Figure 16:
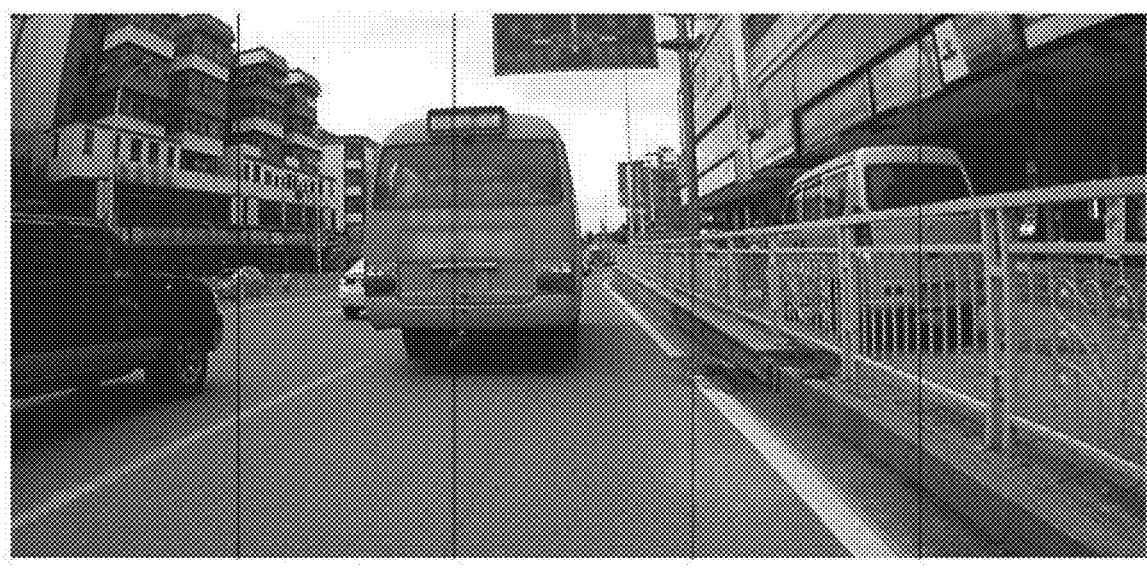
FIG. 16 is a schematic diagram of an embodiment of five non-overlapping sub-fields of view.

In some possible implementations, the N sub-fields of view may be horizontally arranged. Specifically, an example in which N is equal to 5 is used for description. As shown in FIG. 15, the field of view is divided into five non-overlapping sub-fields of view. Each sub-field of view may be a sub-field of view with a width of 20° in the horizontal direction. In this example, a drive voltage-refractive index-sub-field of view correspondence is shown in Table 3. In this case, the control chip may sequentially apply five different drive voltages to the first polarization scanner 321 by using the drive circuit, so that the first polarization scanner 321 can generate five different refractive indices, and the photosensitive device 322 senses echo signals of five different sub-fields of view. It should be noted that, after echo signals of five sub-fields of view with a width of 20° in the horizontal direction are sensed, a field of view with a width of 100° in the horizontal direction shown in FIG. 16 is obtained.

TABLE 3

| Sub-field of view | Drive voltage | Refractive index |
|---|---|---|
| Sub-field of view 1 | 10 V | 40° |
| Sub-field of view 2 | 5 V | 20° |
| Sub-field of view 3 | 0 V | 0° |
| Sub-field of view 4 | −5 V | −20° |
| Sub-field of view 5 | −10 V | −40° |

Figure 17:
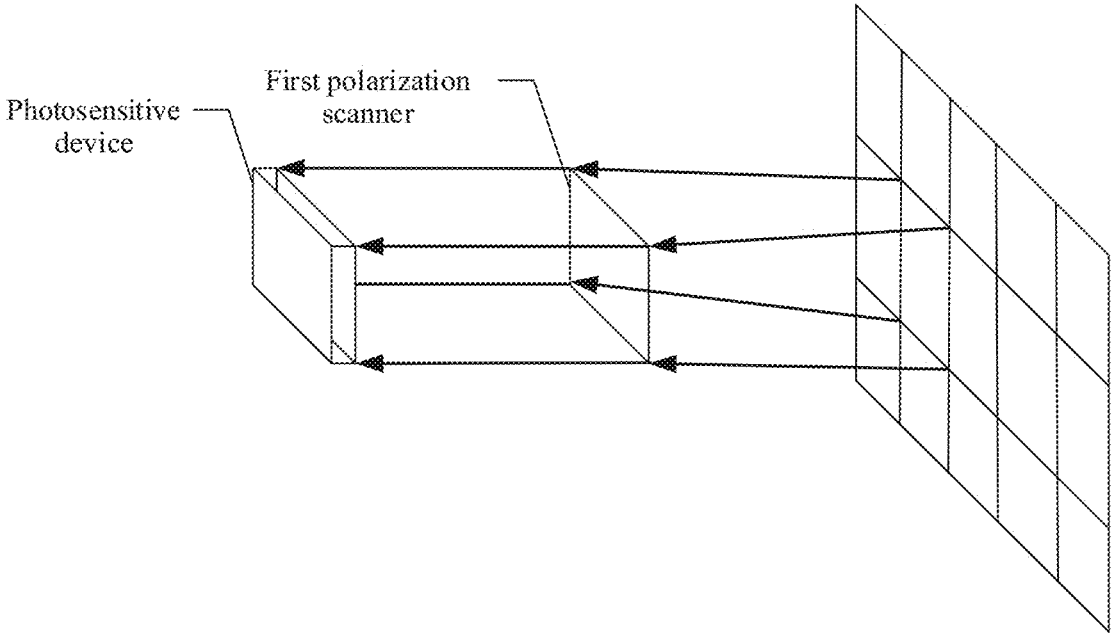
FIG. 17 is a schematic diagram of an embodiment of 15 non-overlapping sub-fields of view.

When the first polarization scanner 321 has two polarizers, a sub-field of view in the horizontal direction and a sub-field of view in the vertical direction may be disposed on the two polarizers. The field of view is divided into N sub-fields of view, and the N sub-fields of view are horizontally arranged in n1 rows and vertically arranged in n2 columns. N is equal to n1 multiplied by n2, and both n1 and n2 are positive integers greater than or equal to 2. Any two of the N sub-fields of view do not overlap. Specifically, an example in which N is equal to 15, n is equal to 5, and n2 is equal to 3 is used for description. As shown in FIG. 17, the field of view is divided into 15 non-overlapping sub-fields of view, and the 15 sub-fields of view are horizontally arranged in five rows and vertically arranged in three columns. Each sub-field of view may be a sub-field of view with a width of 20° in the horizontal direction and a width of 7° in the vertical direction.

Figure 18:
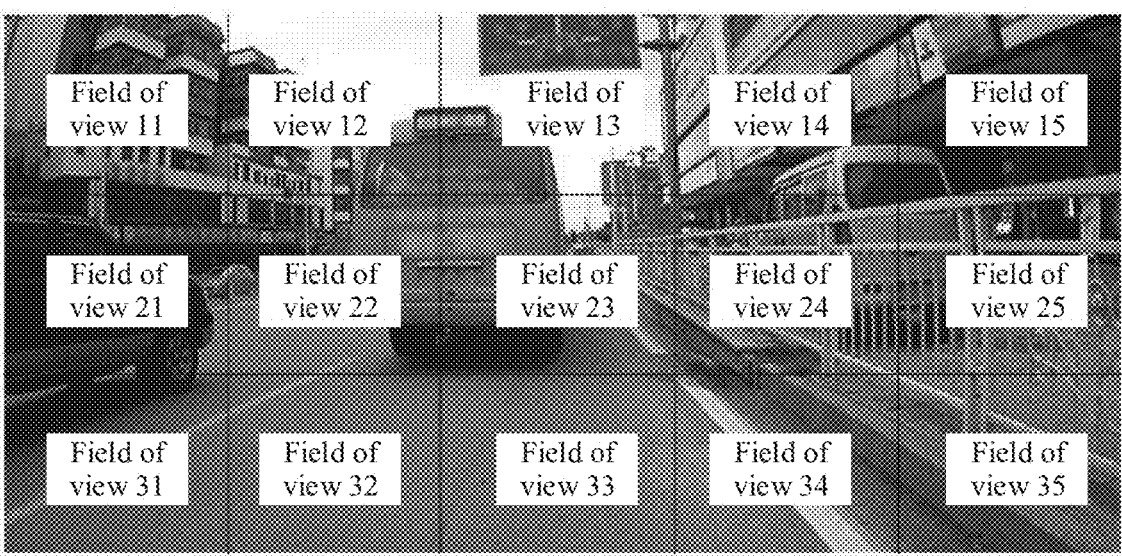
FIG. 18 is a schematic diagram of an embodiment of 15 non-overlapping sub-fields of view.

In this example, a drive voltage-refractive index-sub-field of view correspondence is shown in Table 4. In this case, the control chip may sequentially apply 15 different drive voltages to the first polarization scanner 321 by using the drive circuit, so that the first polarization scanner 321 can generate 15 different refractive indices, and the photosensitive device 322 senses echo signals of 15 different sub-fields of view. It should be noted that, after echo signals of 15 sub-fields of view with a width of 20° in the horizontal direction and a width of 7° in the vertical direction are sensed, a field of view with a width of 100° in the horizontal direction and a width of 21° in the vertical direction shown in FIG. 18 is obtained.

TABLE 4

| Sub-field of view | Drive voltage | Refractive index |
|---|---|---|
| Sub-field of view 11 | (10 V, 3.3 V) | (40°, 7°) |
| Sub-field of view 12 | (10 V, 0 V) | (40°, 0°) |
| Sub-field of view 13 | (10 V, −3.3 V) | (40°, −7°) |
| Sub-field of view 21 | (5 V, 3.3 V) | (20°, 7°) |
| Sub-field of view 22 | (5 V, 0 V) | (20°, 0°) |
| Sub-field of view 23 | (5 V, −3.3 V) | (20°, −7°) |
| Sub-field of view 31 | (0 V, 3.3 V) | (0°, 7°) |
| Sub-field of view 32 | (0 V, 0 V) | (0°, 0°) |
| Sub-field of view 33 | (0 V, −3.3 V) | (0°, −7°) |
| Sub-field of view 41 | (−5 V, 3.3 V) | (−20°, 7°) |
| Sub-field of view 42 | (−5 V, 0 V) | (−20°, 0°) |
| Sub-field of view 43 | (−5 V, −3.3 V) | (−20°, −7°) |
| Sub-field of view 51 | (−10 V, 3.3 V) | (−40°, 7°) |
| Sub-field of view 52 | (−10 V, 0 V) | (−40°, 0°) |
| Sub-field of view 53 | (−10 V, −3.3 V) | (−40°, −7°) |

In some possible implementations, the laser module 310 includes N laser lights. The N laser lights are in a one-to-one correspondence with the N sub-fields of view. Any one of the N laser lights is configured to emit the detection laser to a corresponding sub-field of view in the N sub-fields of view. The N sub-fields of view include the target sub-field of view.

In some possible implementations, the laser module 310 may irradiate a plurality of sub-fields of view in a plurality of manners. For example, the laser module 310 includes at least two laser lights, which are configured to separately emit the detection laser to at least two sub-fields of view. The at least two laser lights are in a one-to-one correspondence with the at least two sub-fields of view.

Figure 19:
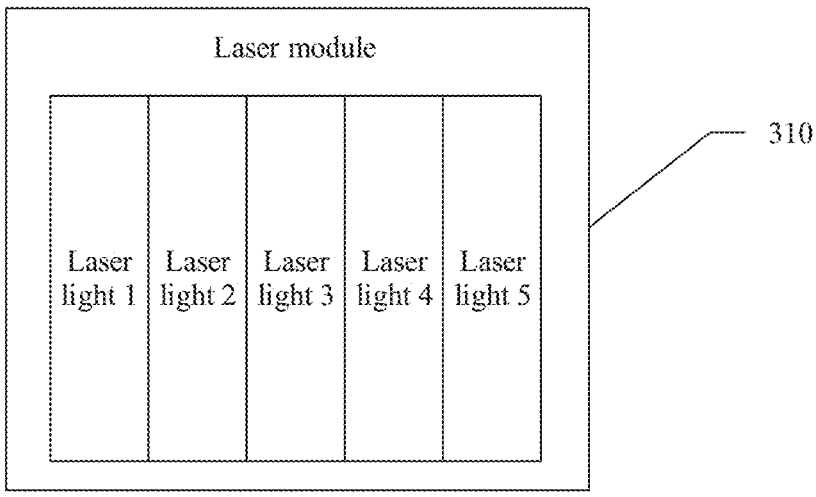
FIG. 19 is a schematic diagram of an embodiment of a laser module.
Figure 20:
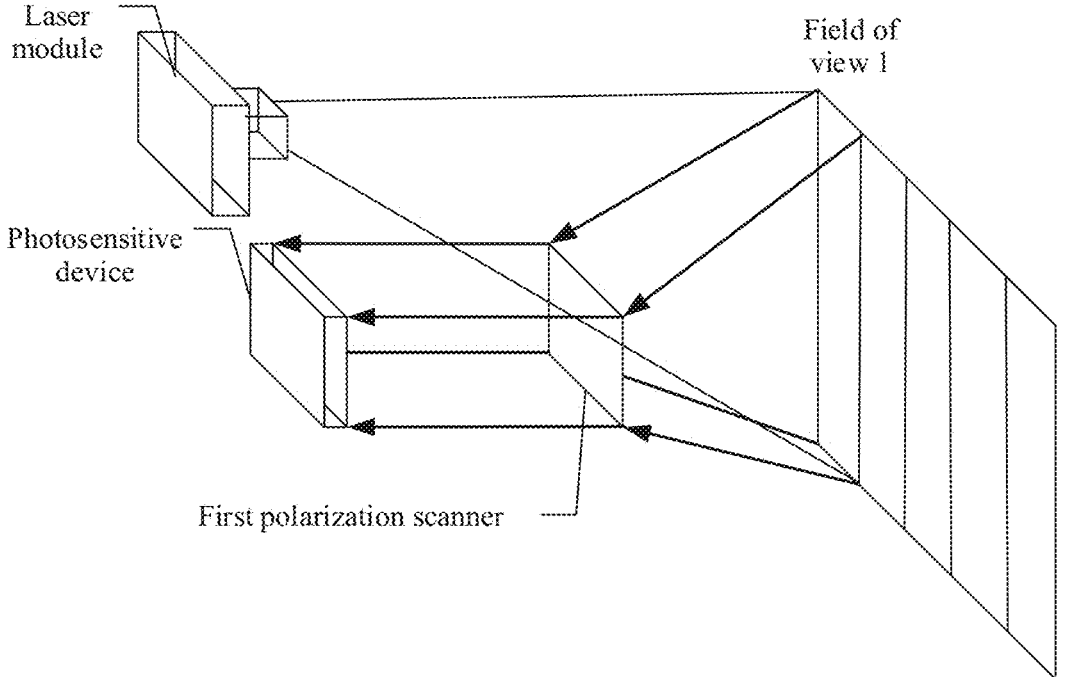
FIG. 20 is a schematic diagram of an embodiment in which a laser module irradiates a sub-field of view.
Figure 21:
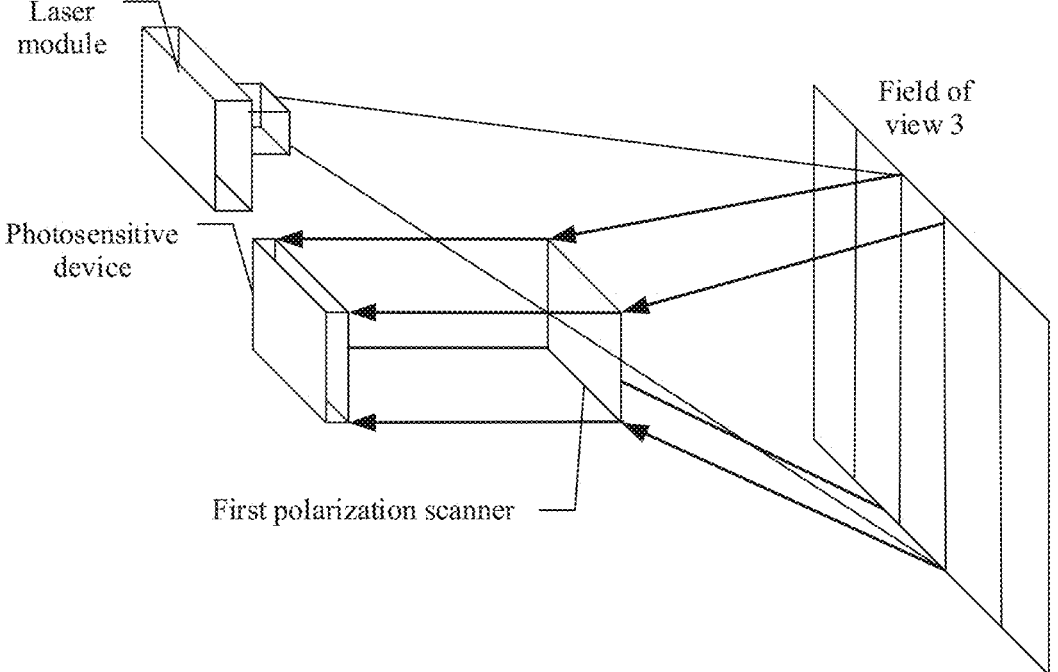
FIG. 21 is a schematic diagram of another embodiment in which a laser module irradiates a sub-field of view.

For example, as shown in FIG. 19, N is equal to 5, that is, the laser module 310 includes five laser lights (laser lights 1, 2, 3, 4, and 5). As shown in FIG. 20 and FIG. 21, the five laser lights are in a one-to-one correspondence with the five sub-fields of view, and each laser light is configured to emit the detection laser to a corresponding sub-field of view, so that the first polarization scanner 321 can sense the echo signal that is of the detection laser and that is in the sub-field of view.

Figure 22:
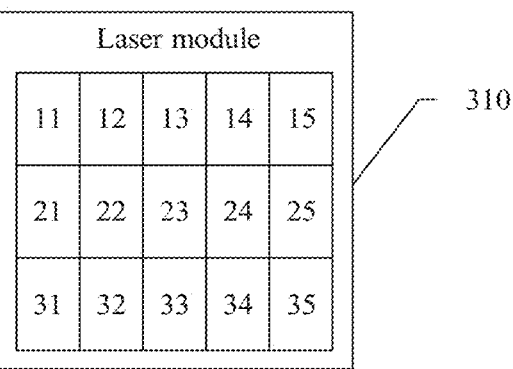
FIG. 22 is a schematic diagram of another embodiment of a laser module.
Figure 23:
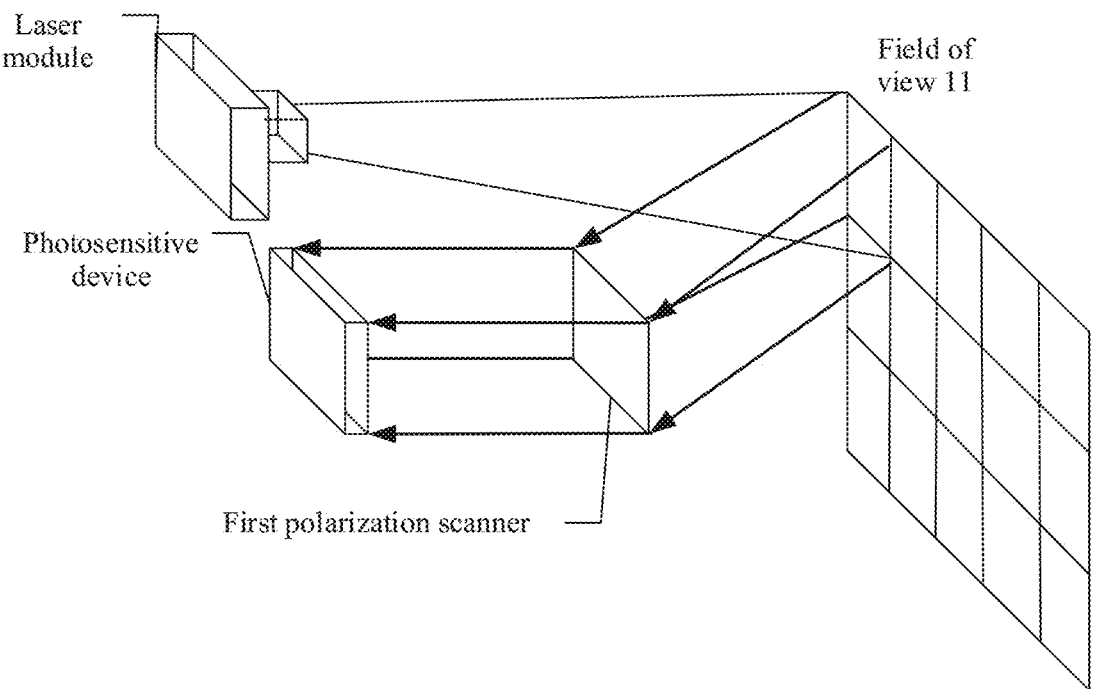
FIG. 23 is a schematic diagram of an embodiment in which a laser module irradiates a sub-field of view.
Figure 24:
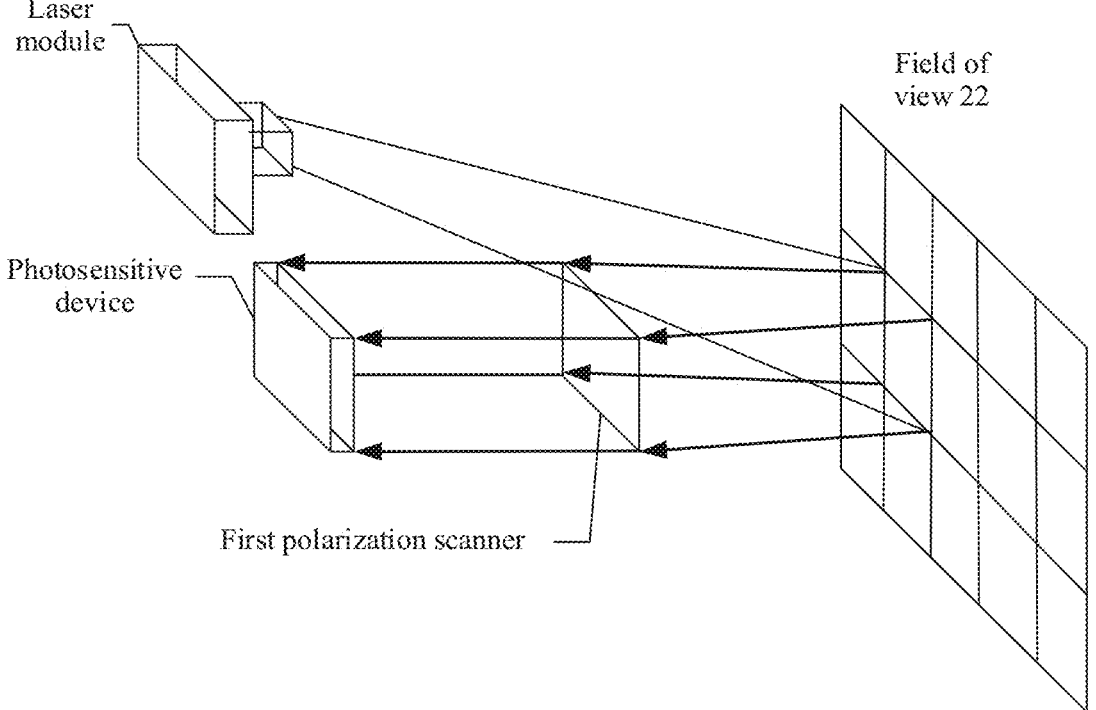
FIG. 24 is a schematic diagram of another embodiment in which a laser module irradiates a sub-field of view.

For example, as shown in FIG. 22, N is equal to 15, that is, the laser module 310 includes 15 laser lights (11, 12, 13, . . . , 34, 35). As shown in FIG. 23 and FIG. 24, 15 laser lights are in a one-to-one correspondence with 15 sub-fields of view, and each laser light is configured to emit the detection laser to a corresponding sub-field of view, so that the first polarization scanner 321 can sense the echo signal that is of the detection laser and that is in the sub-field of view.

In some possible implementations, the laser light is an edge emitting laser (edge emitting laser, EEL) and a quartz fiber. The EEL is configured to emit the detection laser to the quartz fiber, and the quartz fiber is configured to optically shape the detection laser, so that the detection laser is irradiated on a corresponding sub-field of view.

Figure 25:
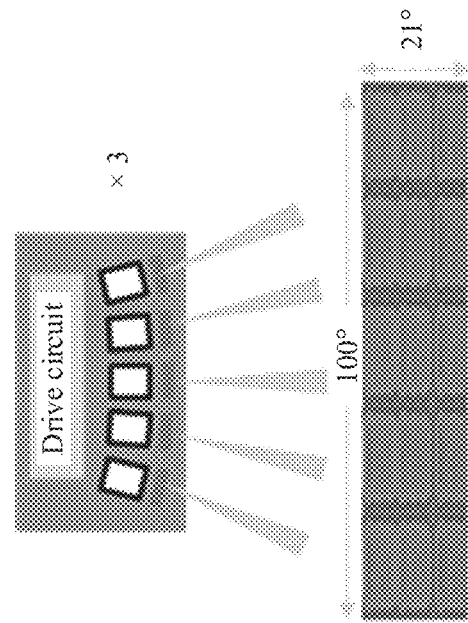
FIG. 25 is a schematic diagram of an embodiment of a laser light.
Figure 25:
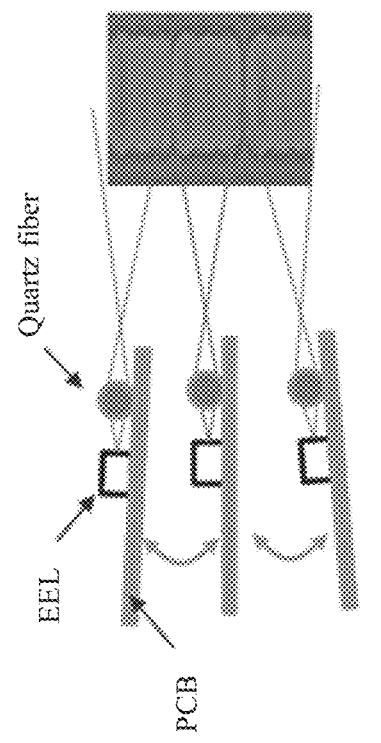

Specifically, the EEL is an irradiation light that has been optically shaped by the quartz fiber and approximately covers a range, for example, a range of 20°×7°. As shown in FIG. 25, the five laser lights form a group and are surface-mounted side by side together with corresponding drive circuits at a specific angle on a same printed circuit board (printed circuit board, PCB), to cover a range of 100°×7°. Three PCBs are arranged at a specific angle to finally obtain a sub-field of view of 100°×21°, and can be divided into five horizontal areas and three vertical areas for specific irradiation.

Figure 26:
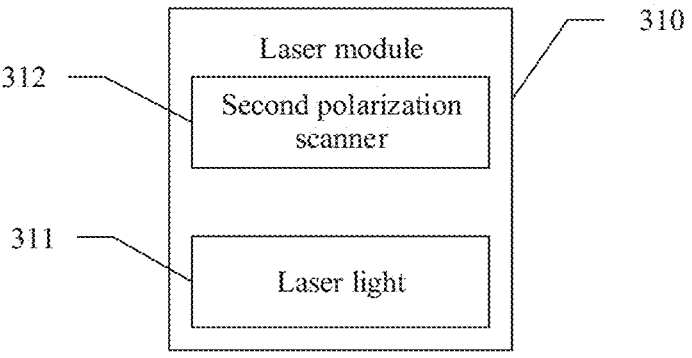
FIG. 26 is a schematic diagram of an embodiment of a laser module.

In some possible implementations, as shown in FIG. 26, the laser module 310 includes a laser light 311 and a second polarization scanner 312. The laser light 311 is configured to emit the detection laser to the second polarization scanner 312, and the second polarization scanner 312 is configured to refract the detection laser by using a second refractive index, so that the detection laser is irradiated on the target sub-field of view. Energy of the laser module 310 is concentrated on one sub-field of view, so that the laser module 310 can irradiate farther. In this case, the first polarization scanner 321 can sense a farther echo signal, to obtain double gains of increasing the field of view and sensing in a longer distance.

Figure 27:
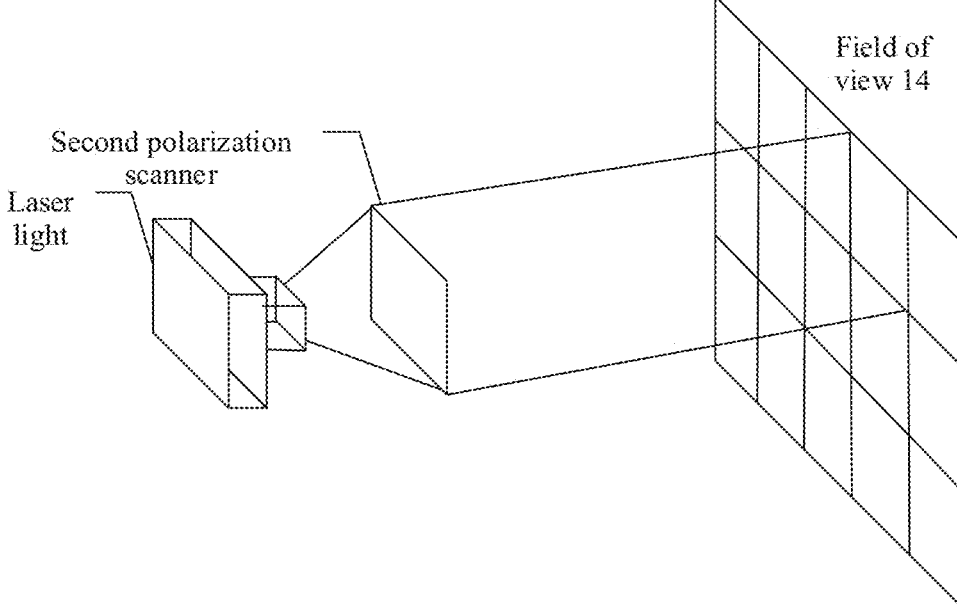
FIG. 27 is a schematic diagram of an embodiment in which a laser module irradiates a sub-field of view.

For example, as shown in FIG. 27, the laser light 311 is configured to emit the detection laser to the second polarization scanner 312, and the second polarization scanner 312 refracts the detection laser to a field of view 14. The second polarization scanner 312 may apply different drive voltages, to change the refractive index and deflect light by different angles, and the laser light 311 can irradiate different sub-fields of view.

In this embodiment of this application, a function and an internal structure of the second polarization scanner 312 are similar to those of the first polarization scanner 321. Details are not described herein again. In some possible implementations, the first polarization scanner 321 and the second polarization scanner 312 may be a same polarization scanner. This is not limited herein.

Figure 28:
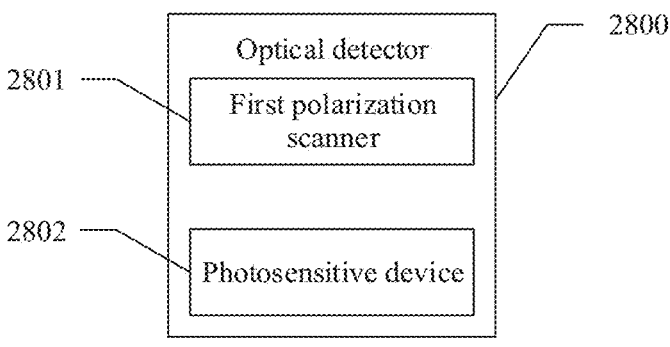
FIG. 28 is a schematic diagram of an embodiment of an optical detector according to this application.

Refer to FIG. 28. This application further provides an optical detector 2800, including a photosensitive device 2802 and a first polarization scanner 2801 with a variable refractive index. The first polarization scanner 2801 is configured to refract an optical signal. The photosensitive device 2802 is configured to sense an optical signal refracted by the first polarization scanner 2801. Specifically, for a function and composition of the optical detector 2800, refer to the optical detector 320 of the radar system 300 in the foregoing embodiment. Details are not described herein again.

Figure 29:
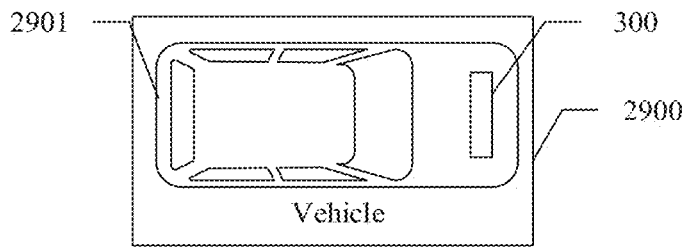
FIG. 29 is a schematic diagram of an embodiment of a vehicle according to this application.

Refer to FIG. 29. This application further provides a vehicle 2900, including a vehicle control system 2901 and the foregoing radar system 300. The vehicle control system 2901 is configured to determine a target sub-field of view, and the radar system 300 is configured to emit the detection laser and sense an echo signal that is of the detection laser and that is in the target sub-field of view.

In some possible implementations, the vehicle control system 2901 is further configured to detect an object and a distance from the object based on the echo signal refracted by the first polarization scanner 321. For example, it can be learned from the field of view 2 and the field of view 3 in FIG. 16, or it can be learned from the field of view 12, the field of view 13, the field of view 22, and the field of view 23 in FIG. 18 that a bus is right ahead and is relatively close to a user. In this case, an indication may be sent to the user to assist the user in driving.

Figure 30:
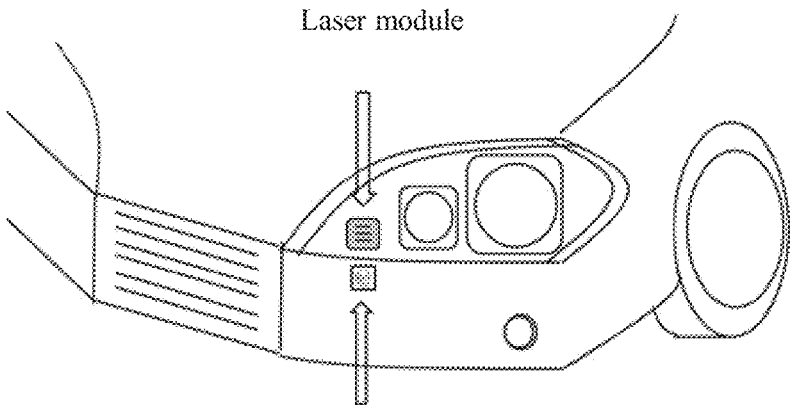
FIG. 30 is a schematic diagram of an embodiment in which a first polarization scanner and a laser module that are in a radar system are separately mounted on a vehicle.

In some possible implementations, the laser module 310 and the optical detector 320 in the radar system 300 are separately mounted at different locations of the vehicle 2900. For example, as shown in FIG. 30, the laser module 310 may be mounted on a headlight or a fog lamp of the vehicle 2900, and the optical detector 320 may be mounted on a bumper or a windshield of the vehicle. Such a mounting manner is flexible, and provides sufficient space for modeling design of a private passenger vehicle.

Figure 31:
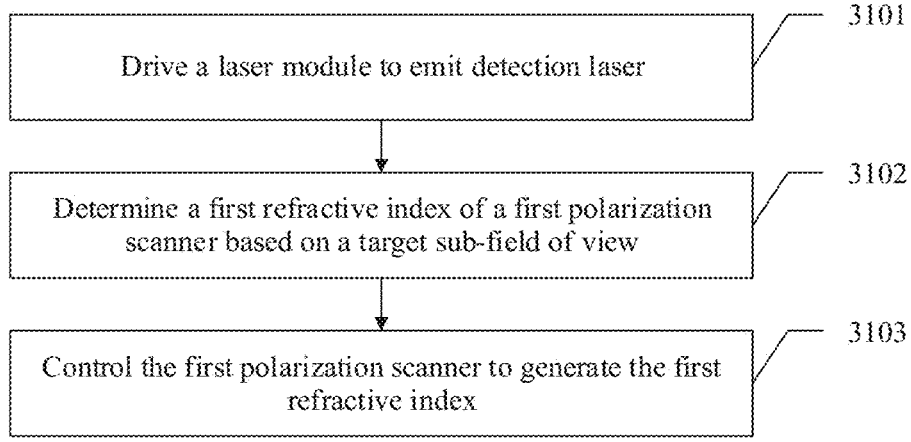
FIG. 31 is a schematic diagram of an embodiment of an optical detection method according to this application.

Refer to FIG. 31. This application further provides an optical detection method, applied to a radar system. The radar system includes a laser module and a first polarization scanner. The method includes the following steps.

3101. Drive the laser module to emit detection laser.

In some possible implementations, the laser module may be driven to emit the detection laser to a target sub-field of view.

3102: Determine a first refractive index of the first polarization scanner based on the target sub-field of view.

In some possible implementations, the target drive voltage may be determined based on the first refractive index, and then a target drive voltage is applied to the first polarization scanner 321.

3103: Control the first polarization scanner to generate the first refractive index.

In this embodiment of this application, when the laser module emits the detection laser, because a refractive index of the first polarization scanner 321 is variable, the first polarization scanner refracts an echo signal of the detection laser by using different refractive indices, so that the photosensitive device 322 senses echo signals at different angles. This increases a field of view of the radar system, and reduces costs of the photosensitive device compared with a solution of increasing a photosensitive area of a photosensitive chip 322 in the photosensitive device 322.

In the specification, claims, and accompanying drawings of embodiments of this application, the terms "first", "second", "third", "fourth", and the like (if existent) do not necessarily indicate a specific order or sequence. It should be understood that the data termed in such a way is interchangeable in proper circumstances, so that embodiments described herein can be implemented in other orders than the order illustrated or described herein. In addition, the terms "include" or "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units.

Some or all of the units may be selected based on actual requirements to achieve the objectives of the solutions in embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A radar system, comprising a laser device, an optical detector, and a control chip, wherein:

the optical detector comprises a first polarization scanner and a photosensitive device;

the laser device is configured to emit detection laser;

the control chip is configured to determine a first refractive index of the first polarization scanner based on a target sub-field of view;

the first polarization scanner is configured to refract an echo signal of the detection laser using the first refractive index, wherein a refractive index of the first polarization scanner is variable; and the photosensitive device is configured to sense the echo signal refracted by the first polarization scanner.

2. The radar system according to claim 1, wherein:

the first polarization scanner comprises a drive circuit and a polarizer, wherein a refractive index of the polarizer is variable;

the drive circuit is configured to apply a target drive voltage to the polarizer; and the polarizer is configured to:

when the target drive voltage is applied, generate the first refractive index; and refract the echo signal of the detection laser by using the first refractive index.

3. The radar system according to claim 2, wherein a material of the polarizer is a metamaterial with a variable refractive index, or a surface of the polarizer is covered with the metamaterial with a variable refractive index.

4. The radar system according to claim 2, wherein the control chip is configured to:

determine the target drive voltage based on the first refractive index.

5. The radar system according to claim 1, wherein the first polarization scanner is configured to refract the echo signal of the detection laser to the photosensitive device.

6. The radar system according to claim 3, wherein the first polarization scanner further comprises:

a reflector, configured to reflect, to the photosensitive device, the echo signal refracted by the polarizer.

7. The radar system according to claim 1, wherein the laser device comprises:

N laser lights, wherein the N laser lights are in a one-to-one correspondence with N sub-fields of view, and each of the N laser lights is configured to emit the detection laser to a corresponding sub-field of view in the N sub-fields of view.

8. The radar system according to claim 7, wherein each of the N laser lights comprises an edge emitting laser (EEL) and a quartz fiber, wherein:

the EEL is configured to emit the detection laser to the quartz fiber; and the quartz fiber is configured to optically shape the detection laser to allow the detection laser to be irradiated on a corresponding sub-field of view.

9. The radar system according to claim 1, wherein the photosensitive device comprises an optical lens and a photosensitive chip, wherein:

the optical lens is configured to focus, on the photosensitive chip, the echo signal refracted by the first polarization scanner; and the photosensitive chip is configured to sense the echo signal focused by the optical lens.

10. The radar system according to claim 7, wherein the N sub-fields of view are horizontally arranged, and any two of the N sub-fields of view do not overlap.

11. The radar system according to claim 7, wherein the N sub-fields of view are horizontally arranged in n1 rows and vertically arranged in n2 columns, wherein N is equal to n1 multiplied by n2, and both n1 and n2 are positive integers greater than or equal to 2, and wherein any two of the N sub-fields of view do not overlap.

12. A vehicle, comprising a vehicle control system and a radar system, wherein the vehicle control system is configured to determine a target sub-field of view, and the radar system is configured to:

emit detection laser; and sense an echo signal that is of the detection laser and that is in the target sub-field of view, and wherein the radar system comprises a laser device, an optical detector, and a control chip, wherein:

the optical detector comprises a first polarization scanner and a photosensitive device;

the laser device is configured to emit the detection laser;

the control chip is configured to determine a first refractive index of the first polarization scanner based on the target sub-field of view;

the first polarization scanner is configured to refract the echo signal of the detection laser using the first refractive index, wherein a refractive index of the first polarization scanner is variable; and the photosensitive device is configured to sense the echo signal refracted by the first polarization scanner.

13. The vehicle according to claim 12, wherein the vehicle control system is further configured to detect an object and a distance from the object based on the echo signal refracted by the first polarization scanner.

14. The vehicle according to claim 12, wherein the laser device and the optical detector in the radar system are separately mounted at different locations of the vehicle.

15. The vehicle according to claim 14, wherein the laser device is mounted on a headlight or a fog lamp of the vehicle, and the optical detector is mounted on a bumper or a windshield of the vehicle.

16. An optical detection method, applied to a radar system, wherein the radar system comprises a laser device and a first polarization scanner, and the method comprises:

driving the laser device to emit detection laser;

determining a first refractive index of the first polarization scanner based on a target sub-field of view; and controlling the first polarization scanner to generate the first refractive index.

17. The method according to claim 16, wherein the controlling the first polarization scanner to generate the first refractive index comprises:

determining a target drive voltage based on the first refractive index; and applying the target drive voltage to the first polarization scanner.

18. The method according to claim 16, wherein the driving the laser device to emit detection laser comprises:

driving the laser device to send the detection laser to the target sub-field of view.

19. The vehicle according to claim 12, wherein:

the first polarization scanner comprises a drive circuit and a polarizer, wherein a refractive index of the polarizer is variable;

the drive circuit is configured to apply a target drive voltage to the polarizer; and the polarizer is configured to:

when the target drive voltage is applied, generate the first refractive index; and refract the echo signal of the detection laser by using the first refractive index.

20. The vehicle according to claim 19, wherein a material of the polarizer is a metamaterial with a variable refractive index, or a surface of the polarizer is covered with the metamaterial with a variable refractive index.

* * * * *